INTERLACED PULSE TRAIN ANALYZER

Filed Dec. 9, 1965

INVENTORS,
HAROLD T. FREEDMAN
HENRY SCHLUSSLER.
BY Harry M. Saragovitz
Edward J. Kelly, Herbert Berl
& Julian C. Keppler
ATTORNEYS March 4, 1969 H. T. FREEDMAN ET AL 3,431,500

INTERLACED PULSE TRAIN ANALYZER

Filed Dec. 8, 1965 Sheet 2 of 2

INVENTORS,
HAROLD T. FREEDMAN
HENRY SCHLUSSLER.

BY Harry M. Saragovitz, Edward J. Kelly, Herbert Berl, & Julian C. Keppler

ATTORNEYS 3,431,500
INTERLACED PULSE TRAIN ANALYZER
Harold T. Freedman, Oakhurst, and Henry Schlussler, Lincroft, N.J., assignors to the United States of America as represented by the Secretary of the Army
Filed Dec. 9, 1965, Ser. No. 512,834
U.S. Cl. 328—110 11 Claims
Int. Cl. H03k 5/20

This invention relates to a system for detecting and sorting pulse trains whose pulse repetition frequencies fall within given limits from a series of incoming pulses which also may contain pulses not belonging to these pulse trains.

In certain applications it is desirable to detect the presence of pulse trains whose pulse repetition rates fall within given limits from a group of incoming pulses which may be random or which contain pulses of pulse repetition rates lying outside said limits. For simplicity of terminology, a pulse train falling within said given limits henceforth will be referred to in the specification and claims as a desired pulse train and the pulse repetition frequency associated therewith henceforth will be referred to as a desired pulse repetition frequency. The interpulse period of such a desired pulse train will be referred to as the desired period. The system of the invention includes two circuit means, the first of which is adapted to represent the interval between any two successive input pulses in terms of an analog voltage and the second of which basically determines whether or not the time interval thus represented is the correct time interval, that is, the time interval between pulses of a desired pulse train. If the interval so tested is not correct, another analog voltage representing the next successive input pulse interval is provided by the first circuit means and again tested by the second circuit means until coincidence between an input pulse and a pulse representative of equality of time intervals is established. When this condition attains, an output is derived which indicates that an input pulse has arrived from a desired pulse train. The second circuit means operates in such a manner that, as long as the desired pulse train continues, an output pulse will be provided as each input pulse from the desired pulse train appears.

Other objects and features of the invention will more fully appear from the following description and drawings, wherein.

Figure 1:
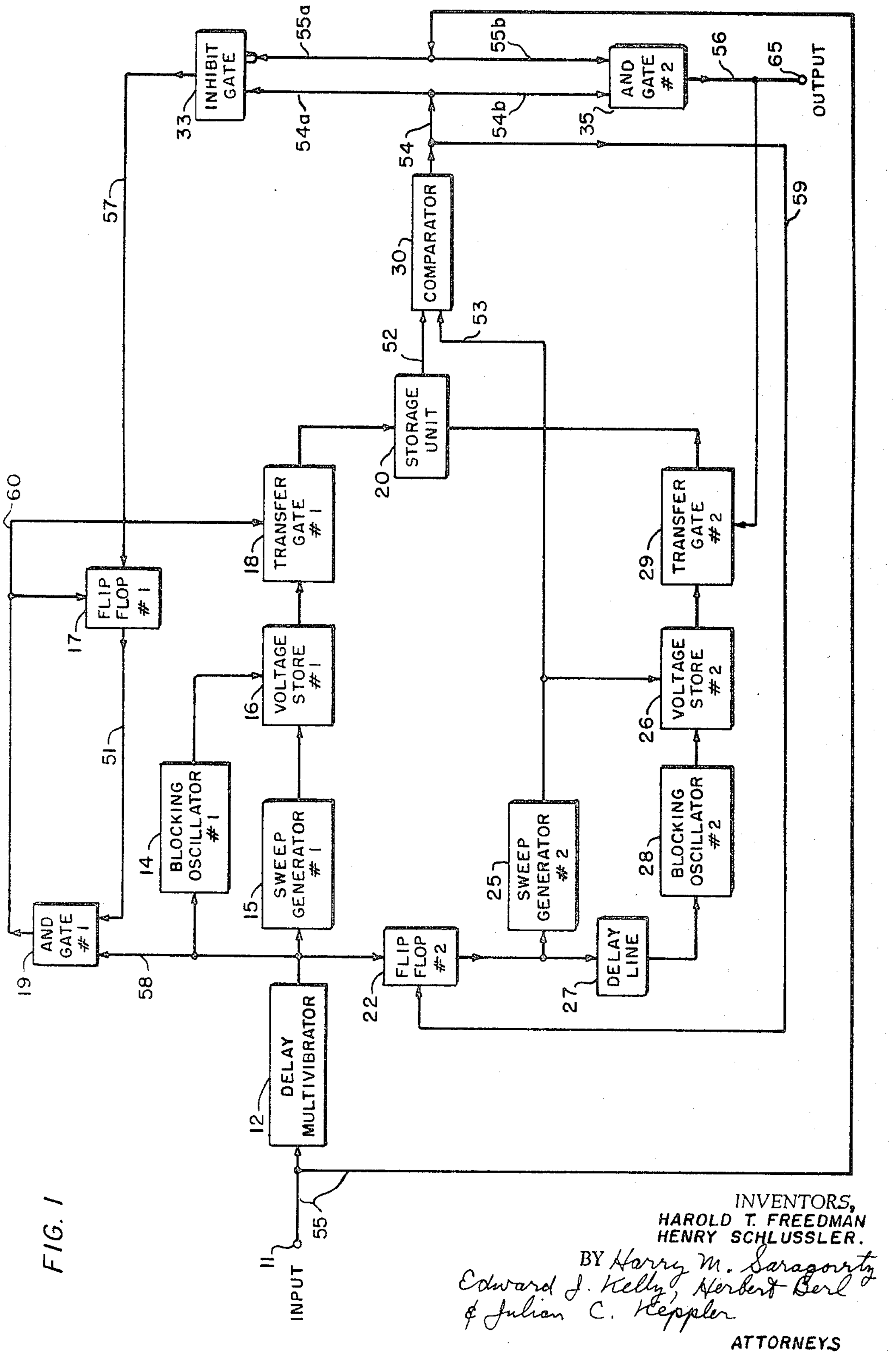
FIG. 1 is a block diagram describing a preferred embodiment of the invention.

Referring to FIG. 1 of the drawing, the first circuit means of the invention includes a first delay multivibrator 12, a first blocking oscillator 14, a first sweep generator 15, a first voltage store 16, a first flip flop 17, a first transfer gate 18, and a first and gate 19. Periodically, a voltage which is the analog of time between adjacent input pulses will be transferred by way of first transfer gate 18 to a storage unit 20. In a manner to be described later, storage unit 20 usually has some fixed voltage initially established thereon from a previous operating cycle.

For reasons to be explained later, each incoming pulse must be delayed slightly before being applied to the sweep generators 15 and 25 and the associated blocking oscillators 14 and 28. Such incoming pulse at input terminal 11 is delayed slightly by means of a delay multivibrator 12; this delay time is very small compared with the desired period. In addition to providing the aforesaid delay, the delay multivibrator also serves as a pulse equalizer to compensate for variations in amplitude, width and shape of the input pulses. The delay multivibrator 12 also provides time for possible transfer to the storage unit 20 by way of gate 18 of the peak value of voltage from sweep generator 15 when a given input pulse arrives; during this time period, this fixed voltage level is available for transfer to the storage unit 20. More specifically, as each input pulse arrives at terminal 11, it triggers the delay multivibrator 12, causing the latter to generate a more or less square wave. Actually, the input pulses precede the leading edge of the delay multivibrator output by a slight amount owing to the delay inherent in the delay multivibrator; however, this delay is relatively small. To facilitate explanation and to conform with additional circuit logic the time of the first input pulse can be assumed to be coincident with the leading edge of the pulse from the delay multivibrator.

At the time of the first input pulse, a ramp voltage from the first sweep generator 15 is initiated. The sweep generator 15 may be a conventional type sweep generator which is reset by each successive input pulse. The voltage store 16, as well as the second voltage store 26, to be described later, comprises essentially a capacitor connected across the output of the sweep generator for maintaining the peak voltage obtained by each sweep voltage for a period following the cessation of the sweep. The voltage stored at the first voltage store 16 will remain until the associated first blocking oscillator 14 is triggered a short interval after the corresponding input pulse by the trailing edge of the delay multivibrator pulse. The output from first blocking oscillator 14, when applied to the first voltage store 16, causes the voltage on the capacitor of voltage store 16 to discharge to ground or other reference potential. This discharging operation continues until the end of the blocking oscillator pulse. The voltage level at first sweep generator 15 existing at the end of the blocking oscillator pulse is then applied to the capacitor in the first voltage store 16; the voltage thereafter continues to follow the voltage of first sweep generator 15 until the arrival of the next input pulse. The first sweep generator 15 then receives the leading edge of the pulse from delay multivibrator 12 and is immediately reset and a new ramp initiated. During the period just prior to the return of a given ramp voltage from first sweep generator 15 to its reference level, the voltage across the capacitor in the first voltage store 16 remains substantially fixed. This constant voltage level obtained during the period of the delay multivibrator pulse is transferred to storage unit 20, provided first transfer gate 18 is open. First transfer gate 18 will be open whenever a given input pulse does not follow the preceding input pulse by the proper time interval (viz, the proper reciprocal of the pulse repetition rate of the desired pulse train to be detected). Furthermore, the first transfer gate 18 is open, if at all, only during the brief period of the delay multivibrator output pulse; it is only during this period that the voltage in voltage store 16 is unvarying.

The second basic circuit means includes a second flip flop 22, a second sweep generator 25, a second voltage store 26, a second blocking oscillator 28 and its associated delay line 27, and a second transfer gate 29. The aforesaid units, with the exception of delay line 27, generally are identical with the corresponding respective units 17, 15, 16, 14 and 18. As each input pulse arrives, following an output from a voltage comparator 30 (to be described later), the leading edge of the corresponding output from the delay multivibrator 12 turns on the second flip flop 22 and a square wave output pulse is derived from second flip flop 22. The pulse from flip flop 22 remains on until turned off, in a manner to be described later, by the next pulse from voltage comparator 30. Since each incoming pulse is responsible for turning on flip flop 22, provided it is not already on, it is necessary to delay slightly each input pulse before applying it to the flip flop 22 so that the latter may have time to become turned off before receipt of the next input pulse. For this reason, a slight delay must be built into the delay multivibrator, as mentioned earlier in the specification. The leading edge of the pulse from flip flop 22 triggers the second sweep generator 25 and a series of sweep voltages are generated each of which has the same slope as the ramps generated by sweep generator 15. The output of second sweep generator 25 is supplied to the second voltage store 36 which may be identical with first voltage store 16. In order for the pulse from second blocking oscillator 28 to start at the same instant as the pulse from first blocking oscillator 14, a delay line 27 is inserted in the input to second blocking oscillator 28; in this way the leading edge of the pulse from second flip flop 22 is delayed by an amount equal to the width of the pulse from the delay multivibrator 12 before being applied to the second blocking oscillator 28. This delay line is necessary, in other words, because the second blocking oscillator 28, in effect, works with the leading edge of the delay multivibrator 12, whereas the first blocking oscillator 14 works with the trailing edge of the same multivibrator. When the second blocking oscillator 28 is triggered by the delayed leading edge of the pulse from second flip flop 22, the voltage from the second sweep generator 25 at voltage store 26 is dumped or returned to the reference level. The output of second voltage store 26, however, will be transferred to storage unit 20 only when the second transfer gate 29 is open; the latter, in turn, is open only when a pulse is supplied from second and gate 35 over line 56.

The output of second sweep generator is continuously supplied via line 53 to the voltage comparator 30 which compares the voltage previously transferred to storage unit 20 and available on line 52 with the instantaneous value of the sweep voltage generated by second sweep generator 25 and available on line 53. The comparator 30 provides an output pulse on line 54 when, and only when, the two inputs on lines 52 and 53 are equal in magnitude. At the instant that the sweep voltage from the second sweep generator 25 attains a voltage level equal to the voltage previously transferred by way of first transfer gate 18 to storage unit 20, a control pulse appears on comparator output line 54. This comparator output line also is one of the input lines to both INHIbit gate 23 and second and gate 35. These inputs will be designated by the same reference number with different subscripts.

There will be always some voltage level stored in storage unit 20 and such voltage will have been previously transferred thereto by way of either first transfer gate 18 or second transfer gate 29. The output of the second sweep generator 25 is supplied directly to the comparator 30 by way of line 53, as well as applied to the second voltage store 26. At some instant during the first sweep voltage generated by first sweep generator 25, the level of this sweep voltage, and consequently the voltage on input line 53 of comparator 30 will eventually equal the voltage on input line 52 of the comparator 30, i.e., the voltage stored in storage unit 20. When this condition attains, which time will be referred to as time $t'$, a control pulse appears on comparator output line 54. This control pulse is applied to the second flip flop 22 to reset the latter; the control pulse also serves as an input to and gate 35 and inhibit gate 33. If no input pulse occurs on line 55 at time $t'$ coincident with a control pulse from comparator 30, there is only one input to and gate 35 and no output pulse appears on output line 56; moreover, there is no enabling pulse at second transfer gate 29, so that no peak voltage stored in second voltage store 26 is transferred to storage unit 20.

It should be noted that second flip flop 22, once set by an input pulse, remains on and that second sweep generator 25 continues to generate a sweep voltage until reset by a control pulse from comparator 30. More than one input pulse may occur, in other words, while a given sweep voltage is being generated by second sweep generator 25. If, during the brief interval that control pulse appears on comparator output line 34, there is no input pulse at input terminal 11, inhibit gate 33 is open and the control pulse from comparator 30 appears at time $t'$ on output line 57 of inhibit gate 33 to turn on first flip flop 17. A square wave from first flip flop 17 exists on the flop line 51 and is supplied as one input to and gate 19 until that flip flop is later reset by the trailing edge of the next output from delay multivibrator 12 associated with the next input pulse. This next input pulse and its time of arrival will be designated at A and $t_A$, respectively. It is during the coincidence of the one period of first flip flop 17 and this next input pulse A (delayed slightly by multivibrator 12) that a pulse appears on output line 60 of first and gate 19 to open first transfer gate 18 and transfer the voltage level then attained by the ramp from sweep generator 15 to storage unit 20. The voltage transferred by open first transfer gate 18 to storage unit 20 at time $t_A$ will be a voltage representative of the time interval between the previous pulse and pulse A. At time $t_A$, the first sweep generator 15 initiates a new ramp. The control pulse from comparator 30 appearing on line 59 at time $t_A$ resets second flip flop 22; this does not turn off flip flop 22, however, and second sweep generator 25 continues to generate a sweep voltage until the next input pulse, herein referred to as pulse B, arrives at time $t_B$ once again to set flip flop 22 for initiation of a new sweep voltage from generator 25 at this time $t_B$.

At some time $t''$ when the level of the last mentioned sweep voltage from second sweep generator 25 reaches a value already stored in storage unit 20, another control pulse appears on comparator output line 54. This voltage level is representative of the time interval $t'$ to $t_A$. If there is still no input pulse at this time $t''$, inhibit gate 33 is open first flip flop 17 is turned on, first and gate 19 is opened and the next input pulse, referred to here as pulse B, and appearing at time $t_B$, passes open gate 19 to enable first transfer gate 18. The level of voltage transferred by way of gate 18 to storage unit 20 at time $t_B$ will be the peak value of the ramp last attained by first sweep generator 15, and will represent the time interval $t_A$ to $t_B$. At time $t_B$ a new ramp is generated by first sweep generator 15. At time $t_B$ the voltage at voltage store 26 has attained a value corresponding to the time interval $t_A$ to $t_B$; however, this voltage cannot be transferred by way of second transfer gate 29 to storage unit 20 since there is no output from second and gate 35 to enable second transfer gate 29. At time $t''$, the flip flop 22 was reset so that, at time $t_B$, flip flop 22 conditions second sweep generator 25 to initiate a new sweep voltage. Eventually, at some time $t'''$, the new sweep voltage from second sweep generator 25 will attain the level last stored in voltage unit 20. This latter level, it will be remembered, corresponds to the time interval $t_A$ to $t_B$ between pulses A and B. At this time $t'''$, a control pulse occurs on comparator output line 54. Now, assume that an input pulse C should arrive at the same time as the control pulse from comparator 30; that is, that time C is identical with time $t'''$. The stored voltage corresponding by time interval $t_A$ to $t_B$ now is equal to the instantaneous level of a linear sweep voltage from second sweep generator 25 which has been initiated at time $t_B$ and has reached the value now attained at time $t'''=t_C$. This means that the time interval $t_A$ to $t_B$ between input pulses A and B is equal to the time interval $t_B$ to $t_C$ between input pulses B and C. Thus, the time of input pulse C of the desired pulse train is established by an output pulse appearing at output terminal 65 of second and gate 35 whose inputs are the simultaneous occurring control pulse on line **54*a* and the input pulse C on line 54*b*. When an output pulse occurs from second and gate 35, it will be noted that INHIbit gate 33** concurrently is disabled so that no further transfer of voltages stored by the first circuit means of the system is permitted. The output pulse at time $t_C$ from second and gate 35 enables second transfer gate 29 and a voltage from second voltage store 26 equal to the time interval $t_B$ to $t_C$ passes enabled gate 29 and is transferred to storage unit 20. When the next pulse D from the desired pulse train arrives at time $t_D$—an interval of time equal to the time interval $t_B$ to $t_C$ after pulse C—the sweep voltage from second sweep generator 25, which voltage was initiated at time $t_C$ as a result of resetting by the control pulse and the immediate setting by input pulse D, will have just reached the voltage level stored in storage unit 20. A control pulse from comparator 30 then will coincide with the input pulse D to enable second and gate 35 and produce another output pulse which is carried by way of line 56 to output terminal 65. So long as the desired input pulse train continues, this locking action will continue and an output pulse will appear at output terminal 65 at the time an input pulse from the desired pulse train occurs.

The manner of operation of the system of FIG. 1 will now be described by referring to the wave forms of FIG. 2 derived for an assumed set of input pulses 2(*a*). It will be noted in FIG. 2 that there are three independent pulse trains, one occurring at times $t_{1a}$, $t_{3a}$, $t_{5a}$, $t_{6a}$, $t_{9a}$, $t_{10a}$ and $t_{13a}$ spaced apart by the time interval $\Delta T_A$, another train of pulses occurring at times $t_{2a}$, $t_{5a}$, $t_{8a}$ and $t_{11a}$, spaced apart by time interval $\Delta T_B$, and still another train of pulses occuring at times $t_{4a}$, $t_{7a}$ and $t_{12a}$ spaced apart by the time interval $\Delta T_C$. The system of the invention is adapted to detect pulses from the pulse train of highest pulse repetition rate (corresponding to the time interval $\Delta T_A$ between pulses). The input pulses of FIG. 2*a* have been shown at three different levels, to distinguish more readily the distinct pulse trains; in practice, the pulses may differ considerably in amplitude, width and shape. Such differences as do exist are minimized, however, by means of the delay multivibrator 12 which receives the input pulses and produces a pulse of fixed duration and amplitude. It should be noted that the true amplitude of the wave forms shown in FIGS. 2*b*, 2*h* to 2*m* inclusive and 2*o* are not necessarily drawn to scale. The wave forms of FIGS. 2*d* to 2*g* inclusive and 2*m*, however, are drawn to scale—the scale assumed being such the sawtooth waves of FIGS. 2*a* and 2*g* can attain a peak value of four voltage units in the time interval $\Delta T_A$. The slopes of the linear sawtooths or ramps generated by sweep generators 15 and 25 are identical and the slopes are selected to provide a reasonable range of analog voltages corresponding to the anticipated range of pulse repetition rates of the pulse train to be detected.

At time $t_{1a}$, the first input pulse arrives at input terminal 11 and appears on input line 55; at this time, the delay multivibrator 12 is triggered and an output is produced from time $t_{1a}$ to time $t_{1b}$, as shown in FIG. 2*b*. The leading edge of the output pulse from delay multivibrator 12 is used to trigger first sweep generator 15; a linear sawtooth wave form (FIG. 2*d*) is initiated at time $t_{1a}$ and continues until the next pulse arrives at time $t_{2a}$ to reset first sweep generator 15 and initiate another sweep voltage. The trailing edge of the pulse from delay multivibrator 12 at time $t_{1b}$ is used to trigger first blocking oscillator 14. The latter then generates a pulse from time $t_{1b}$ to $t_{1c}$ (see FIG. 2*c*) which dumps the original voltage stored in first voltage store 16. In other words, the pulse from first blocking oscillator 14 reduces the original voltage stored in first voltage store 16 from some value existing prior to the start of the present operating cycle to the reference level of the system, which may be ground potential or zero volts. See FIG. 2*e*. At the end of the pulse from first blocking oscillator 14 at time $t_{1c}$, the voltage stored in first voltage store 16 starts to follow the voltage of the first sawtooth derived from first sweep generator 15, as shown in FIG. 2*e*, and continues to do so until the end of this sweep voltage from first sweep generator 15 at time $t_{2a}$. The peak voltage of the first sweep voltage from first sweep generator 15 at time $t_{2a}$ is retained in the voltage store 16 until the next pulse from blocking oscillator 14 is reduced at time $t_{2b}$ by the trailing edge of the second multivibrator pulse. The fixed voltage in first voltage store 16 from time $t_{2a}$ to time $t_{2b}$ is not transferred to storage unit 20 since the first transfer gate 18 is closed. As shown in FIG. 2*f* the voltage stored in storage unit 20 from prior operation of the system is assumed initially to be two voltage units, for purposes of explanation only.

Figure 2:
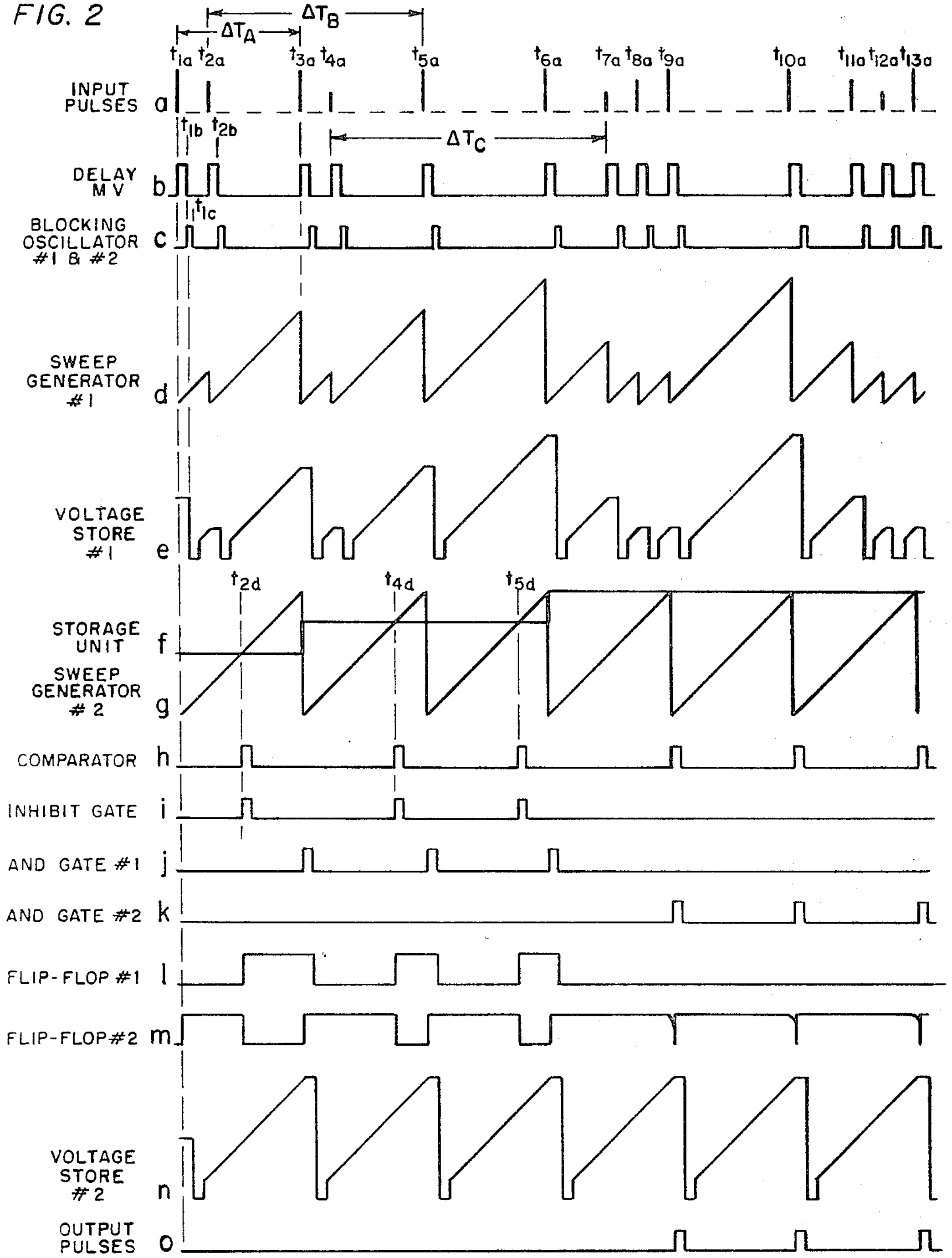
FIG. 2 is a series of wave forms illustrating the operation of the system described in FIG. 1.

In the example shown in FIG. 2, the peak value of the first sweep voltage from second sweep generator 25 attained at time $t_{2a}$ when the second input pulse occurs is less than the value of voltage already stored in storage unit 20. The first sweep voltage is shown, by way of example, in FIG. 2*g* as starting at time $t_{1a}$; this need not be the case, however, for the first sweep voltage generated. Since, in the example shown, the sweep voltage from second sweep generator 25 does not equal the voltage stored in storage unit 20, there is no output from comparator 30, inhibit gate 33 is closed, first flip flop 17 remains off and both transfer gates 18 and 29 remain closed. No change occurs in the value of voltage originally stored in storage unit 20 since the fixed voltage in first voltage store 16 from $t_{2a}$ to $t_{2b}$ cannot be transferred through closed first transfer gate 18 to storage unit 20. The peak voltage level of the first sawtooth remains in first voltage store 16 until time $t_{2b}$, after which the voltage therein is reduced to zero. The second flip flop 22, which was turned on at time $t_{1a}$ by the leading edge of the first pulse from delay multivibrator 12, remains on until later turned off by an output pulse from comparator 30 appearing on line 59.

At time $t_{2a}$ of arrival of the second input pulse, the second output pulse from delay multivibrator 12 commences and remains until time $t_{2b}$. At time $t_{2a}$ the second sawtooth is generated by first sweep generator 15 and continues until the next input pulse at time $t_{3a}$. At a time $t_{2d}$ between the first and third input pulses, the first sawtooth from sweep generator 25 (see wave form of FIG. 2*g*) reaches the value of voltage (two voltage units) stored in storage unit 20 (see wave form of FIG. 2*f*). In other words, the voltage on comparator input lines 52 and 53 will be equal at time $t_{2d}$; consequently, a comparator output pulse (see wave form of FIG. 2*h*) will appear on the output line 54 of comparator 30. Pulses thus appear on input lines 54*a* and 54*b* of inhibit gate 53 and second and gate 35, respectively. While the first pulse on output line 54 of comparator 30 exists, there is no input pulse on line 55. In other words, inhibit gate 33 has a pulse (FIG. 2*h*) on input line 54*a* but no pulse on input line 55*a*. Inhibit gate 33 thus passes an output pulse (see wave form of FIG. 2*i*) which appears on inhibit gate output line 57. At the same time, line 54*b* of second and gate 35 is active but input line 55*b* of and gate 35 carries no pulse; therefore, second and gate 35 is closed and there is no pulse (see wave form of FIG. 2*k*) on output line 56 supplied to output terminal 65.

The pulse from inhibit gate 33 (waveform of FIG 2*i*) turns on first flip flop 17 which produces an output pulse on line 51, as indicated by the wave form of FIG. 21; this pulse appears on one input line of first and gate 19, and remains until time $t_{3b}$ following reception of the third input pulse. When the third input pulse arrives at time $t_{3a}$ the second sawtooth from first sweep generator 15 resets to zero; however, the peak value of this sawtooth (three voltage units) existing at time $t_{3a}$ is held at first voltage store 16 until a later time $t_{3b}$. During the time interval $t_{3a}$ to time $t_{3b}$ the third pulse from multivibrator 12 appears on input line 58 of first and gate 19; this gate already is enabled by the output of first flip flop 17 which still exists on the other input line 51. The pulse from first and gate 19 is supplied by way of line 60 to first transfer gate 18 during the time $t_{3a}$ to $t_{3b}$ and enables gate 18 during this time interval. The fixed voltage (three voltage units) at voltage store 16 is transferred by way of open gate 18 to storage unit 20, thereby replacing the two voltage units previously stored therein. The pulse from first and gate 19 at time interval $t_{3a}$ to $t_{3b}$ also is applied to first flip flop 17 and turns on the same at time $t_{3b}$. First transfer gate 18 also is closed at time $t_{3b}$ since there is no longer is an input on line 51 of first and gate 19 and, hence, no output on line 60 of first and gate 19. Meanwhile, the second flip flop 22 has been turned on at time $t_{3a}$ and a second ramp is initiated by second sweep generator 25. The third sawtooth generated by first sweep generator 15 is reset to zero by the fourth input pulse at time $t_{4a}$. The peak voltage at interval $t_{4a}$ to $t_{4b}$ in first voltage store 16 will not be transferred by way of closed first transfer gate 18 and the first voltage store 16 will be dumped at time $t_{4b}$. By the time $t_{4c}$, the voltage in first voltage store 16 will assume the value then attained by the fourth sawtooth from first sweep generator 15 and will follow the fourth sawtooth until arrival, at time $t_{5a}$, of the fifth input pulse. At time $t_{4d}$, the second sawtooth from second sweep generator 25 attains an instantaneous voltage level (two voltage units) equal to that previously stored in storage unit 20. At this instant, a second output pulse appears on comparator output line 54; there is no input pulse on line 55 at this time, but inhibit gate 33 is open, first flip flop 17 once again is turned on, and line 51 leading to the first and gate 19 is active. The second flip flop 22 is turned off by the output from comparator 30 on line 59 at time $t_{5a}$. Sweep generators 15 and 25 continue to generate fourth and second ramps, respectively, until the next input pulse at time $t_{5a}$. The fifth pulse from delay multivibrator 12 at the input line of enabled first and gate 19 passes therethrough and opens first transfer gate 18 during the time interval $t_{5a}$ to $t_{5b}$, and turns off first flip flop 17 at time $t_{5b}$. The fixed voltage at first voltage store 16 during this interval $t_{5a}$ to $t_{5b}$ passes open first transfer gate 18; however, this level is the same voltage level (three voltage units) already stored in unit 20. The fifth sawtooth from first sweep generator 15 is initiated at time $t_{5a}$ by the leading edge of the fifth pulse from delay multivibrator 12, while the third ramp from second sweep generator 25 is initiated at the same time $t_{5a}$ by the leading edge of the third pulse from flip flop 22. At time $t_{5d}$, the instantaneous value of the third ramp generated by second sweep generator 25, appearing comparator input line 53, becomes equal to the voltage (three voltage units) stored in storage unit 20. The third output pulse from comparator 30 occurs on line 54, inhibit gate 33 is open, and a pulse appears on line 51 to turn on first flip flop 17 and enable and gate 19. Moreover, second flip flop 22 is turned off by the comparator pulse on line 59. At the time $t_{6a}$, arrival of the sixth input pulse, the voltage of the fifth sawtooth from first sweep generator 15 has attained a value of four voltage units. This indicates that the interval between the sixth input pulse and the previous (fifth) input pulse is equal to the pulse repetition frequency of the desired pulse train. During the time interval $t_{6a}$ to $t_{6b}$, the fixed voltage level of four voltage units at first voltage store 16 is transferred by way of open first transfer gate 18 to storage unit 20, since gate 18 is open. For the first time, a voltage is stored in storage unit 20 which represents the analog of the pulse repetition rate of the desired pulse train. At times $t_{7a}$ to $t_{8a}$ of arrival of the seventh and eighth input pulse respectively, the peak values of the sixth and seventh sawteeth from first sweep generator 15 are not transferred to storage unit 20 since first transfer gate 18 is closed. The first transfer gate 18 is closed because there is no comparator output at line 54 at times $t_{7a}$ and $t_{8a}$, inhibit gate 33 is closed, there is no enabling input pulse on line 51 to first and gate 19, and no pulse on line 60.

At the time $t_{9a}$ of arrival of the ninth input pulse, important changes occur. The voltage of the fourth ramp generated by second sweep generator sawtooth 25 attains a level equal to that stored in storage unit 20, viz. four voltage units, at the same time that the ninth input pulse occurs. There is a control pulse or comparator output line 54 and the input lines 54*a* and 54*b* of both inhibit gate 33 and second and gate 35. Unlike previous occurrences when a comparator control pulse occurred, an input pulse now apears at the same time as the control pulse at input lines 55*a* and 55*b* of inhibit gate 33 and second and gate 35, respectively. For the first time, therefore, inhibit gate 33 is closed, while second and gate 35 is opened. Since there is no output on the line 57 of inhibit gate 33, first flip flop 17 remains off. The first and gate 19 is closed and first transfer gate 18 remains closed. For this reason, the fixed value at time $t_{9a}$ of the eighth ramp from first sweep generator 15 is not transferred to storage unit 20. At the time $t_{9a}$ at the arrival of the ninth input pulse on line 55, second and gate 35 is opened for the first time, since this is the first time that a comparator output pulse on line 54*b* on second and gate 35 has been accompanied by an input pulse on the other input line 55*b* of said and gate. The output pulse is carried by output line 56 of second and gate 35 to the output terminal 61. The duration of the output pulse on line 56 is shown in FIG. 2, by way of example, as equal to the duration of the pulse from delay multivibrator 12. Prior to time $t_{9a}$, the second and gate 35 was always closed, and the second transfer gate 29 also remained closed; consequently, the fixed voltage at the second voltage store 26 (see the wave form of FIG. 2*n*) had not been transferred to storage unit 20. During the interval of time $t_{9a}$ to time $t_{9b}$, the fixed voltage (four voltage units) at second voltage store 26 is transferred by way of open second transfer gate 29 to storage unit 20. This voltage, however, is identical with that already stored in unit 20. At time $t_{9a}$ the comparator outpulse carried by line 59 to second flip flop 22 turns off the latter. At time $t_{9a}$, however, the flip flop 22 would normally be turned on by the leading edge of the pulse from delay multivibrator 12. In order to allow time for the flip flop 22 to turn off before arrival of the next input pulse, a slight delay of the input to flip flop 22 is necessary. This delay may be built into the delay multivibrator 12 so that the leading edge of the delay multivibrator pulse lags slightly the input pulse at input terminal 11. This delay is so slight, however, that the leading edge of the pulse from delay multivibrator 12 may be considered to reset sweep generator 15 coincident with arrival of an input pulse on line 55.

At time $t_{10a}$, the fifth ramp from second sweep generator 25 will reach a level of four voltage units—the value of voltage stored in storage unit 20. A fifth control pulse from comparator 30 appears on line 54 at the same time that the input pulse appears on lines 55*a* and 55*b* of respective gates 53 and 35. Inhibit gate 33 remains closed, but second and gate 35 is open during the interval $t_{10a}$ to $t_{10b}$. The output pulse on line 56, in addition to providing an indication at the output terminal 65, also enables second transfer gate 29 and allows transfer of the fixed level of four voltage units at second voltage store 26 by way of second transfer gate 29 to storage unit 20 during the interval $t_{10a}$ to $t_{10b}$. The voltage thus transferred is the same as that already stored in storage unit 20. It is now evident that, so long as the desired pulse train continues, there will continue to be an output pulse at output terminal 65 each time an input pulse from that train arrives; for example, the next output pulse would occur at output terminal 65 at time $t_{13a}$. In other words, the occurrence of an output pulse at output terminal 65 is indicative of the presence of pulses from the desired pulse train.

The particular embodiment of the invention illustrated and described herein is illustrative only and the invention includes such other modifications and equivalents as may readily appear to those skilled in the art, within the scope of the appended claims.

What is claimed is:

1. A device for sorting input pulses of a pulse train having a desired pulse repetition frequency from a series of input pulses comprising first generating means for generating a sequence of ramp voltages each of which are analogs of the time interval between a corresponding pair of adjacent input pulses, means for storing such voltage analog, voltage comparison means, transfer means for transferring said voltage analog to said comparison means, second generating means for producing a sequence of sweep voltages having the same sweep rate as said ramp voltages and initiated during the presence of certain of said input pulses, said comparison means providing a control pulse when the magnitude of the transferred voltage analog is equal to the magnitude of said sweep voltage, and control means responsive to concurrence of an input pulse and said control pulse for producing output pulses indicative of the presence of an input pulse from the desired pulse train.

2. A device for sorting input pulses of a pulse train having a desired pulse repetition frequency from a series of input pulses comprising first generating means for generating a sequence of ramp voltages each of which are analogs of the time interval between a corresponding pair of adjacent input pulses, means for storing such voltage analog, voltage comparison means, transfer means for transferring said voltage analog to said comparison means, second generating means for producing a sequence of sweep voltages having the same sweep rate as said ramp voltages and initiated during the presence of certain of said input pulses, said comparison means providing a control pulse when the magnitude of the transferred voltage analog is equal to the magnitude of said sweep voltage, and control means responsive to concurrence of an input pulse and said control pulse for producing output pulses indicative of the presence of an input pulse from the desired pulse train, said control means including means responsive to said output pulse for disabling the storage of said voltage analog.

3. A device for sorting input pulses of a pulse train having a desired pulse repetition frequency from a series of input pulses comprising first generating means for generating a sequence of ramp voltages each of which are analogs of the time interval between a corresponding pair of adjacent input pulses, means for storing such voltage analog, voltage comparison means, transfer means for transferring said voltage analog to said comparison means, second generating means for producing a sequence of sweep voltages having the same sweep rate as said ramp voltages and initiated during the presence of certain of said input pulses, said comparison means providing a control pulse when the magnitude of the transferred voltage analog is equal to the magnitude of said sweep voltage, and control means response to concurrence of an input pulse and said control pulse for producing output pulses indicative of the presence of an input pulse from the desired pulse train, said control means including means responsive to said output pulse for disabling the storage of said voltage analog, said control means further including means responsive to said output pulse for transferring a voltage analog of the time between pulses of a desired pulse train to said comparator.

4. A device for sorting a pulse train of a desired pulse repetition frequency from a group of input pulses comprising voltage comparison means, first and second time base generators for producing a group of first and second voltage ramps having the same sweep rate, first circuit means for transferring the peak value of a given one of said first ramps representative of the time interval between a given pair of first and second adjacent input pulses to said comparison means, second circuit means for supplying one of said second ramps initiated during arrival of a third input pulse following the second of said adjacent input pulses to said comparison means, said comparison means providing a corresponding control pulse when the value of said second ramp equals the peak voltage of said given first ramp, and gating means responsive to the coincidence of said corresponding control pulse and said third input pulse indicative of the presence of an input pulse from the desired input pulse train.

5. A device for sorting input pulses of a pulse train having a desired pulse repetition frequency from a group of input pulses, first and second time base generators each productive of a series of first and second ramp voltages of the same sweep rate, first circuit means including means for storing briefly the peak value of each first ramp voltage representative of the time interval between each pair of adjacent input pulses, second circuit means including means for storing briefly the peak value of each second ramp voltage, said second ramp voltage being initiated during the presence of an input pulse, a voltage storage unit, voltage comparison means coupled to said storage unit and continuously receptive of the second ramp voltages, said first circuit means including first means for transferring the first peak voltage representative of the time interval between a given pair of adjacent input pulses provided said peak voltage exceeds the voltage already stored in said storage unit, said second circuit means including second means for transferring the peak value of each second ramp voltage to said storage unit to the exclusion of said first peak voltage, said comparator providing a control pulse when the voltage level of said second ramp voltage representative of a time interval commencing concurrently with a given input pulse equals the voltage already stored in said storage unit representative of the time interval between said given input pulse and the input pulse immediately preceding said given input pulse, and means for providing an output pulse indicative of the presence of an input pulse from said desired pulse train during coincidence of said given input pulse and said control pulse.

6. A device for sorting input pulses of a pulse train having a desired pulse repetition frequency from a series of input pulses comprising first generating means for producing ramp voltages each attaining a peak value representative of the time interval between the corresponding pair of adjacent input pulses, second generating means for producing sweep voltages of the same slope as said ramp voltages and each initiated during arrival of one of said input pulses, voltage comparison means continuously receptive of said sweep voltages, first circuit means for transferring the peak value of a ramp voltage to said comparison means, second circuit means for transferring the peak value of a sweep voltage to said comparison means, the peak value of said ramp voltages and said sweep voltages being transferred to the exclusion of one another, said comparison means producing a control pulse when the voltage level of a sweep voltage becomes substantially equal to the voltage level transferred by a given circuit means, first gating means for enabling the transfer of another ramp voltage to said comparison means in response to the simultaneous presence of a control pulse and the absence of an input pulse, and second gating means for providing an output pulse indicative of the presence of a given input pulse from the desired pulse train when said control pulse is accompanied by said given input pulse.

7. A device for sorting pulse trains having a desired pulse repetition frequency range from a random series of pulses comprising a first time base generator for initiating a separate ramp voltage for each successive input pulse, each said ramp voltage having a duration equal to the interval between a pair of successive input pulses and a peak amplitude representative of said duration, a voltage comparator, storage means for supplying a stored voltage to said voltage comparator which is an analog of the interval between a corresponding pair of adjacent input pulses, a second time base generator for establishing a series of recurring sweep voltages, said voltage comparator being receptive of said sweep voltages, first transfer means for transferring the peak value of each ramp voltage to said storage means for each input pulse, said comparator comparing the voltage stored in said storage means with each sweep voltage for deriving a control pulse when the magnitudes of said stored voltage and said sweep voltage are substantially equal, an inhibit gate receptive of said control pulse and operative in the absence of an input pulse to enable said first transfer means, second transfer means transferring the peak value of said sweep voltage to said storage unit in response to coincidence of a given control pulse with an input pulse, and means for deriving an output voltage when a given control pulse is coincident with an input pulse, said output voltage occurring when a voltage level corresponding to the time interval between each successive pulse from said desired pulse train has been stored in said storage means.

8. A device for sorting an input pulse train having a desired pulse repetition frequency from a series of input pulses comprising first generating means for producing a succession of ramp voltages each initiated in response to a corresponding input pulse and reaching a peak value representative of the time interval between that input pulse and the next input pulse, first storage means for storing the peak value of each ramp for a brief time interval after occurrence of said input pulse, second generating means for producing a succession of separate sweep voltages each initiated in response to an input pulse and having the same sweep rate as said ramp voltages, second storage means for storing the peak value, voltage comparison means, said comparison means being continuously supplied with said sweep voltages from said second generating means, first transfer means for transferring the peak value of a given ramp to said comparison means, second transfer means for transferring the peak value of a given sweep voltage to said comparison means, said comparison means providing a control pulse when a given sweep voltage attains the same magnitude as the voltage previously transferred to said comparison means, and circuit means for providing output pulses indicative of the presence of input pulses from the desired pulse train during the simultaneous appearance of said control pulse and an input pulse from said desired pulse train, said circuit means disabling said first transfer means in response to output pulses and for disabling said second transfer means during the absence of output pulses.

9. A device for sorting input pulses of a desired pulse repetition frequency from a series of input pulses comprising means for deriving first fixed voltage levels of brief duration the magnitude of which correspond to the interval between a corresponding pair of adjacent input pulses, second circuit means for deriving second fixed voltage levels of brief duration the magnitude of which correspond to the interval between certain input pulses of said desired pulse train, a storage unit, means including said first and second circuit means for transferring said first and second voltage levels to said storage unit to the exclusion of one another voltage, comparison means for comparing the instantaneous voltage level of a continuous ramp voltage initiated upon arrival of an input pulse with a first voltage level stored during each interval between successive pulses, said comparison means providing an output pulse when said voltage levels are equal, first gating means enabled when said comparator output pulse is unaccompanied by an input pulse for permitting further peak voltage levels to be stored in said storage unit which correspond to the interval between successive input pulses, second gating means enabled when said comparator output pulse coincides with a given input pulse for providing an output pulse substantially coincident with said given input pulse indicative of the presence of the desired pulse train.

10. A device for sorting input pulses of a pulse train having a desired pulse repetition frequency from a series of input pulses comprising a first time base generating means for producing ramp voltages each initiated by a given input pulse and each attaining a peak value representing the time interval between said given input pulse and the next input pulse, first storage means for storing during a brief interval the peak value of each ramp voltage, first circuit means for removing the voltage stored in said first storage means for a short period immediately following said interval, a storage unit for storing voltages supplied from said first and second circuit means, second time base generating means for producing sweep voltages each representing a time interval, voltage comparison means coupled to said storage unit and continuously receptive of said sweep voltages, second storage means for storing during brief intervals the peak value of each sweep voltage, second circuit means for removing the voltage stored in said second storage means for a short period immediately following said storage, a first transfer gate interposed between said first storage means and said storage unit, a second transfer gate interposed between said second storage means and said storage unit, said comparison means producing a control pulse when the instantaneous value of a given sweep voltage is equal to the voltage supplied thereto from either of said circuit means, a first bistable device, a first and gate enabled while said first bistable device is in one of two states, an inhibit gate enabled during the simultaneous presence of a control pulse and the absence of a given input pulse for causing said first bistable device to assume said one state, said first and gate supplying an enabling pulse to said first transfer gate during the input pulse immediately following said given input pulse for transferring the peak voltage stored in said first storage means to said storage unit, a second bistable device reset by a given control pulse from said comparison means for initiating a sweep voltage upon arrival of the next input pulse following said given control pulse, a second and gate responsive to the simultaneous presence of said given control pulse and the following input pulse for providing an output pulse indicating that said following input pulse is a pulse from said desired pulse train.

11. A device for sorting input pulses of a pulse train having a desired pulse repetition frequency from a series of input pulses comprising a first time base generating means for producing ramp voltage each initiated by a given input pulse and each attaining a peak value representing the time interval between said given input pulse and the next input pulse, first storage means for storing during a brief interval the peak value of each ramp voltage, first circuit means for removing the voltage stored in said first storage means for a short period immediately following said interval, a storage unit for storing voltages supplied from said first and second circuit means, second time base generating means for producing sweep voltages each representing a time interval, voltage comparison means coupled to said storage unit and continuously receptive of said sweep voltages, second storage means for storing during brief intervals the peak value of each sweep voltage, second circuit means for removing the voltage stored in said second storage means for a short period immediately following said storage, a first transfer gate interposed between said first storage means and said second storage unit, a second transfer gate interposed between said second storage means and said storage unit, said comparison means producing a control pulse when the instantaneous value of a given sweep voltage is equal to the voltage supplied thereto from either of said circuit means, a first bistable device, a first and gate enabled while said first bistable device is in one of two states, an inhibit gate enabled during the simultaneous presence of a control pulse and the absence of a given input pulse for causing said first bistable device to assume said one state, said first and gate supplying an enabling pulse to said first transfer gate during the input pulse immediately following said given input pulse for transferring the peak voltage stored in said first storage means to said storage unit, a second bistable device reset by a given control pulse from said comparison means for initiating a sweep voltage upon arrival of the next input pulse following said given control pulse, a second and gate responsive to the simultaneous presence of said given control pulse and the following input pulse for providing an output pulse indicating that said following input pulse is a pulse from said desired pulse train, said output pulse further enabling said second transfer gate to permit transfer of the peak voltage stored in said second storage means to said storage unit.

References Cited

UNITED STATES PATENTS

| | | | |
|---|---|---|---|
| 2,493,648 | 1/1950 | Watton et al. | 328—108 |
| 2,943,261 | 6/1960 | Relis | 328—108 |

ARTHUR GAUSS, *Primary Examiner.*

H. DIXON, *Assistant Examiner.*